(12) United States Patent
Cheng et al.

(10) Patent No.: US 11,977,823 B2
(45) Date of Patent: May 7, 2024

(54) METHOD FOR DESIGNING HIGH-RIGIDITY BLADE BASED ON STOCHASTIC ISOGEOMETRIC ANALYSIS

(71) Applicant: ZHEJIANG UNIVERSITY, Hangzhou (CN)

(72) Inventors: Jin Cheng, Hangzhou (CN); Zhenyu Liu, Hangzhou (CN); Minglong Yang, Hangzhou (CN); Jianrong Tan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 578 days.

(21) Appl. No.: 17/209,260

(22) Filed: Mar. 23, 2021

(65) Prior Publication Data

US 2021/0232722 A1 Jul. 29, 2021

Related U.S. Application Data

(63) Continuation of application No. PCT/CN2019/111694, filed on Oct. 17, 2019.

(30) Foreign Application Priority Data

Dec. 27, 2018 (CN) .......................... 201811615070.2

(51) Int. Cl.
*G06F 30/17* (2020.01)
*G06F 111/06* (2020.01)
*G06F 111/08* (2020.01)

(52) U.S. Cl.
CPC .......... *G06F 30/17* (2020.01); *G06F 2111/06* (2020.01); *G06F 2111/08* (2020.01)

(58) Field of Classification Search
CPC ... G06F 30/17; G06F 2111/08; G06F 2111/06
(Continued)

(56) References Cited

U.S. PATENT DOCUMENTS

2002/0065636 A1 5/2002 Yamaguchi et al.
2009/0024370 A1 1/2009 Scott et al.
(Continued)

FOREIGN PATENT DOCUMENTS

CN 102322407 A 1/2012
CN 102629291 A 8/2012
(Continued)

OTHER PUBLICATIONS

International Search Report (PCT/CN2019/111694); dated Jan. 19, 2020.
(Continued)

*Primary Examiner* — Brian S Cook
(74) *Attorney, Agent, or Firm* — W&G Law Group

(57) ABSTRACT

In a method for designing a high-rigidity blade based on stochastic isogeometric analysis, the models of stochastic fields of the material property and the external load of the blade are established based on manufacturing conditions and service environment of the blade; an optimization model of the blade is established according to high-rigidity design requirements of the blade and a constraint condition of lift-drag ratio, which is then solved. In the solution procedure, a stochastic isogeometric analysis method is used to calculate the stochastic displacement of the blade under the influence of the randomness of the material property and the external load, and the maximum lift-drag ratio of the blade airfoil is also calculated, based on which the fitness values of individuals in the current population are calculated, so that the high-rigidity design of the blade is realized in the premise of ensuring the lift-drag ratio.

4 Claims, 4 Drawing Sheets

(58) Field of Classification Search
USPC .......................................................... 703/1
See application file for complete search history.

(56) References Cited

U.S. PATENT DOCUMENTS

| 2012/0310604 | A1* | 12/2012 | Bazilevs | G06F 30/23 |
| | | | | 703/1 |
| 2016/0275207 | A1 | 9/2016 | Qian et al. | |
| 2017/0018118 | A1 | 1/2017 | Li et al. | |

FOREIGN PATENT DOCUMENTS

| CN | 103321853 A | 9/2013 | | |
| CN | 104331534 A | 2/2015 | | |
| CN | 106384384 A | 2/2017 | | |
| CN | 107526898 A | 12/2017 | | |
| CN | 107908914 A | 4/2018 | | |
| CN | 109766604 A | 5/2019 | | |
| EP | 2181410 A1 | 5/2010 | | |
| WO | WO-2009012370 A1 | * | 1/2009 | ......... G06F 17/5018 |

OTHER PUBLICATIONS

"The Study of Blade Design and Experiment of Horizontal Axil Turbine" entire document(Ou, Xiankun) Dec. 15, 2015.

'Blade design and performance analysis of tidal current energy turbine' entire document(Liu, Xuefeng) Apr. 15, 2015.

'Research Advances in Isogeometric Analysis-based Optimum Design of Structure' entire document(Liu, Hongliang et al.) Jun. 30, 2018.

'Isogeometric Analysis of functionally graded porous plates reinforced by graphene platelets' entire document(Keyan Li) Nov. 15, 2018.

"Isogeometric analysis and Genetic Algorithm for shape-adaptive composite marine propellers" entire document (Manudha T) Feb. 1, 2015.

* cited by examiner

METHOD FOR DESIGNING HIGH-RIGIDITY BLADE BASED ON STOCHASTIC ISOGEOMETRIC ANALYSIS

CROSS-REFERENCE TO RELATED APPLICATIONS

This application is a continuation of International Application No. PCT/CN2019/111694, filed on Oct. 17, 2019, which claims priority to Chinese Patent Application No. 201811615070.2, filed on Dec. 27, 2018. The disclosures of the aforementioned applications are hereby incorporated by reference in their entireties.

TECHNICAL FIELD

The present disclosure relates to the field of marine current power generation and, in particular, to a method for designing a high-rigidity blade based on stochastic isogeometric analysis.

BACKGROUND

One of the hot topics in the field of marine current power generation is the design of high-rigidity blades. In an environment such as severe weather or astronomical tides, the blades are prone to be deformed and damaged. In order to strengthen the blade rigidity without increasing weight and manufacturing cost of the blade, the blade airfoil must be optimized under the premise of ensuring the hydrodynamic performance of the blade, to strengthen the blade rigidity. Therefore, solving the optimization design problem of maximizing blade rigidity under the constraints of the hydrodynamic performance is required.

Blades of a horizontal-axis marine current power generator are usually made of composite material, whose properties have obvious randomness. The service environment of the horizontal-axis marine current power generator is an ocean, and the impact load of the marine current also has natural randomness. Thus, the response of the blades is inevitably random, due to those uncertainties. Stochastic response analysis of the blades can be divided into two categories, i.e., experimental methods and simulation ones. The experimental methods require a large number of experiments to simulate uncertainties such as random loads. Also, when collecting the information of response such as displacement, sensors cannot be arranged on all the surfaces of the blades, which impedes the collection of the information of the blades' stochastic response and ultimately affects the accuracy of experimental results. In addition, in the process of optimizing the design, the experimental methods require to manufacture a large number of blades of different sizes due to the constantly changing size of the blades, which results in a high cost. Thus, the experimental methods are impracticable. The simulation methods use an existing three-dimensional modeling and numerical calculation software to establish the simulation models of the blades. The size of the three-dimensional model can be easily modified, so that the structural response of the blades in different sizes under stochastic loads can be obtained efficiently with low cost, to meet the requirements of high-rigidity design.

The difficulty of the simulation analysis of a blade is to accurately represent the randomness of its material properties and external loads, and to discretize the stochastic displacement. Construction of the discretization scheme for the stochastic displacement is the most difficult. The construction of the discretization scheme for the stochastic displacement is the prerequisite for obtaining the expression of the blade's stochastic displacement, which determines the efficiency and accuracy of the blade's stochastic response finally calculated.

SUMMARY

An object of the present disclosure is to provide a method for designing a high-rigidity blade based on stochastic isogeometric analysis, in view of the shortcomings in the conventional design method. In this method, a material property and an external load of a blade are determined according to its manufacturing conditions and service environment, and the random field models of the material property and external load of the blade are established; an optimization model for achieving an optimal design of the blade according to high-rigidity design requirements is established. In an optimization process, a stochastic isogeometric analysis method is used to analyze a stochastic normal displacement of the blade in an objective function, discretize the stochastic fields of the material property and the external load of the blade, and determine a discretization scheme for a stochastic normal displacement, to obtain an expression of the stochastic normal displacement. In this way, the analysis of the stochastic normal displacement of the blade with stochastic uncertainties in material and load is implemented, and the high-rigidity design of a blade is realized.

In order to achieve the above objectives, a technical solution adopted by the present disclosure is a method for designing a high-rigidity blade based on stochastic isogeometric analysis. The method includes following steps:

1) parameterizing a blade airfoil, and determining design parameters and ranges of design parameters according to design rules of an airfoil;
2) describing a material property and an external load of the blade considering spatially dependent uncertainties by using stochastic fields, providing expressions of an objective function and a constraint function for optimizing the blade airfoil according to a design requirement of the high-rigidity blade, and establishing a high-rigidity design model of the blade:

$$\min f(x,r)\, s.t.\, g(x)=R_{L/D|new}(x) \leq R_{L/D|ori}, x_{min} \leq x \leq x_{max}$$

where $x$ is a design vector of the blade, including multiple design parameters of the blade; $r=\{E(\theta), F(\theta)\}$ is a stochastic field vector, two components $E(\theta)$ and $F(\theta)$ respectively represent stochastic fields of the material property and the external load of the blade with spatially dependent uncertainties, and $\theta$ is a set of samples in the stochastic fields; $f(x,r)=[\mu(U(\theta)), \sigma(U(\theta))]$ is an objective function characterizing a rigidity of the blade, $U(\theta)$ is a stochastic normal displacement of the blade under a combined influence of a stochastic material property and a stochastic external load, $\mu(U(\theta))$ is an average value of the stochastic normal displacement of the blade, and $\sigma(U(\theta))$ is a standard deviation of the stochastic normal displacement of the blade; $g(x)=R_{L/D|new}(x)$ is a maximum lift-drag ratio of the blade airfoil, the maximum lift-drag ratio is independent of $r$, $R_{L/D|ori}$ is a maximum lift-drag ratio of an initial blade airfoil; $x_{min}$ is a lower limit value of the design vector of the blade, and $x_{max}$ is an upper limit value of the design vector;

(3) calculating the stochastic normal displacement of the blade under the combined influence of the stochastic material property and the stochastic external load by using a stochastic isogeometric analysis method, where the stochastic normal displacement of the blade characterizes the rigidity of the blade in the high-rigidity design model of the blade; and further calculating an optimal solution to the high-rigidity design model of the blade, to obtain an optimized blade airfoil.

Further, in the step (3), the optimal solution of the high-rigidity design model of the blade is solved through a genetic algorithm by following sub-steps:

3.1) generating an initial population and setting an evolutional generation as k=0;

3.2) calculating the stochastic normal displacement of the blade corresponding to each individual in a current population, by using the stochastic isogeometric analysis method;

3.3) calculating the maximum lift-drag ratio of the blade airfoil corresponding to each individual in the current population;

3.4) calculating values of the objective function and the constraint function in the high-rigidity design model of the blade according to the stochastic normal displacement of the blade and the maximum lift-drag ratio of the blade airfoil, so as to obtain fitness of all individuals in the current population;

3.5) sorting all individuals in the current population according to the fitness;

3.6) checking whether a maximum evolutional generation is reached; if a maximum evolutional generation is reached, an optimal solution is derived; otherwise, performing genetic operations including at least one of selection, crossover and mutation to generate a new population, setting the evolutional generation k=k+1, and returning to the step 3.2);

3.7) obtaining design parameter values of an optimal blade airfoil according to the optimal solution.

Further, in the step 3.2), the stochastic normal displacement of the blade considering spatially dependent stochastic uncertainties of the material and external load is calculated by the stochastic isogeometric analysis method by following steps:

a) establishing a parameterized three-dimensional model of a blade based on T-spline, and setting a boundary condition;

b) discretizing the stochastic fields of the material property and external load of the blade, by following sub-steps:

b.1) performing an eigen decomposition on a covariance function of the stochastic field, to obtain a second kind Fredholm integral equation;

b.2) expressing eigenfunctions of the covariance function of the stochastic field by T-spline basis functions, to obtain an expression of the covariance function of the stochastic field based on T-spline basis functions;

b.3) solving the second kind Fredholm integral equation by a Galerkin method, to obtain a series of eigenvalues of the covariance function of the stochastic field, and values of undetermined coefficients in the expression of b.2);

b.4) obtaining discrete expressions of the stochastic fields of the material property and the external load of the blade by using a Karhunen-Loeve expansion; discretizing each of the stochastic fields into a product of stochastic variables, coefficients and T-spline basis functions;

b.5) determining the number of retained items for the Karhunen-Loeve expansion according to a practical condition;

b.6) calculating stochastic stiffness matrices and a stiffness matrix at a mean value of the stochastic field of the material property, and calculating stochastic load vectors and a load vector at a mean value of the stochastic field of the external load;

c) discretizing the stochastic normal displacement of the blade, by following sub-steps:

c.1) constructing a stochastic Krylov subspace of an equilibrium equation of the blade;

c.2) in order to reduce complexity of the subspace, using an inverse matrix of the stiffness matrix at the mean value of the stochastic field of the material property as a complexity reduction factor, multiplying the complexity reduction factor respectively on left and right sides of the equilibrium equation, to realize a preprocessing of the stochastic Krylov subspace;

c.3) calculating a displacement of the blade when the stochastic fields of the material property and external load of the blade are at the mean values;

c.4) calculating basis vectors of the stochastic Krylov subspace, and discretizing the stochastic normal displacement of the blade by using the basis vectors, to obtain a displacement expression of the blade;

c.5) determining the number of retained items of a discretization scheme for the basis vectors of the stochastic Krylov subspace according to a practical conditions;

c.6) deducing an error expression of the discretization scheme for the basis vectors of the stochastic Krylov subspace;

c.7) minimizing an error by applying a Bubnov-Galerkin condition, to ensure accuracy of the discretization scheme for the basis vectors of the stochastic Krylov subspace; and calculating undetermined coefficient vectors in the expression in c.4), according to a weak or strong form of the Bubnov-Galerkin condition;

c.8) obtaining the stochastic normal displacement of the blade.

Further, a calculation equation for the stochastic normal displacement $U(\theta)$ is discretized based on the basis vectors of the stochastic Krylov subspace as follows:

$$U(\theta) = a_1\left(\bar{U} + K_0^{-1}\sum_{i=1}^{M_2}\eta_i F_i\right) + a_2\left(K_0^{-1}\sum_{i=1}^{M_1}\xi_i K_i \bar{U} + (K_0^{-1})^2\sum_{i_1=1}^{M_1}\sum_{i_2=1}^{M_2}\xi_{i_1}\eta_{i_2}K_{i_2}\bar{U}\right) +$$

$$a_3\left((K_0^{-1})^2\sum_{i_1,i_2=1}^{M_1}\xi_{i_2}\xi_{i_1}K_{i_2}K_{i_1}\bar{U} + (K_0^{-1})^3\sum_{i_1,i_2=1}^{M_1}\sum_{i_3=1}^{M_2}\xi_{i_2}\xi_{i_1}\eta_{i_3}K_{i_3}K_{i_2}\bar{U}\right) +$$

$$\ldots + a_m\left((K_0^{-1})^{m-1}\sum_{i_1,\ldots,i_{m-1}=1}^{M_1}\xi_{i_1}\ldots\xi_{i_{m-1}}K_{i_{m-1}}\ldots K_{i_2}\bar{U} + (K_0^{-1})^m\sum_{i_1,\ldots,i_{m-1}=1}^{M_1}\sum_{i_m=1}^{M_2}\xi_{i_1}\ldots\xi_{i_{m-1}}\eta_{i_m}K_{i_m}\ldots K_{i_2}\bar{U}\right)$$

wherein $\{a_1, a_2, \ldots a_m\}$ is a coefficient vector; $\bar{U}$ is a displacement of the blade in a case that the stochastic fields of the material property and the external load of the blade are both at the mean values; $\bar{E}$ is the mean value of the stochastic field of the material property of the blade; $M_1$ is the number of retained items of the stochastic field of the material property of the blade using the Karhunen-Loeve expansion, and $M_2$ is the number of retained items of the stochastic field of the external load of the blade using the Karhunen-Loeve expansion; $K_0^{-1}$ is a complexity reduction factor; $\{K_{i_1}, K_{i_2}, \ldots K_{i_m}\}$ is stochastic stiffness matrices; $F_i$ is a stochastic load vector; m is the number of retained items in the discretization scheme for the basis vectors of the stochastic Krylov subspace; $\{\xi_{i_1}, \xi_{i_2}, \ldots, \xi_{i_m}\}$ and $\{\eta_{i_1}, \eta_{i_2}, \ldots, \eta_{i_m}\}$ are respectively uncorrelated Gaussian stochastic variables.

Beneficial effects of the present disclosure lie in: comprehensively considering the randomness of the material property and the received external load of the blade, establishing the stochastic fields of the material property and the received external load of the blade for analysis, the calculation model for the displacement of the blade is comprehensive and consistent with practical conditions. In the design of the high-rigidity blade, advanced isogeometric analysis technology is used to calculate the displacement of the blade under the influence of stochastic uncertain materials and stochastic external loads, thereby eliminating an approximate error generated when a 3D CAD model is converted into a CAE analysis model. Moreover, the stochastic displacement of the blade is discretized by using basis vectors of a stochastic Krylov subspace, which is efficient in calculation, and more accurate analysis result of the stochastic displacement is achieved. Combination of genetic algorithm and stochastic isogeometric analysis method helps to improve the blade rigidity while ensuring the hydrodynamic performance of the blade.

DESCRIPTION OF EMBODIMENTS

The present disclosure will be further described below in conjunction with the drawings and specific embodiments.

Figure 1:
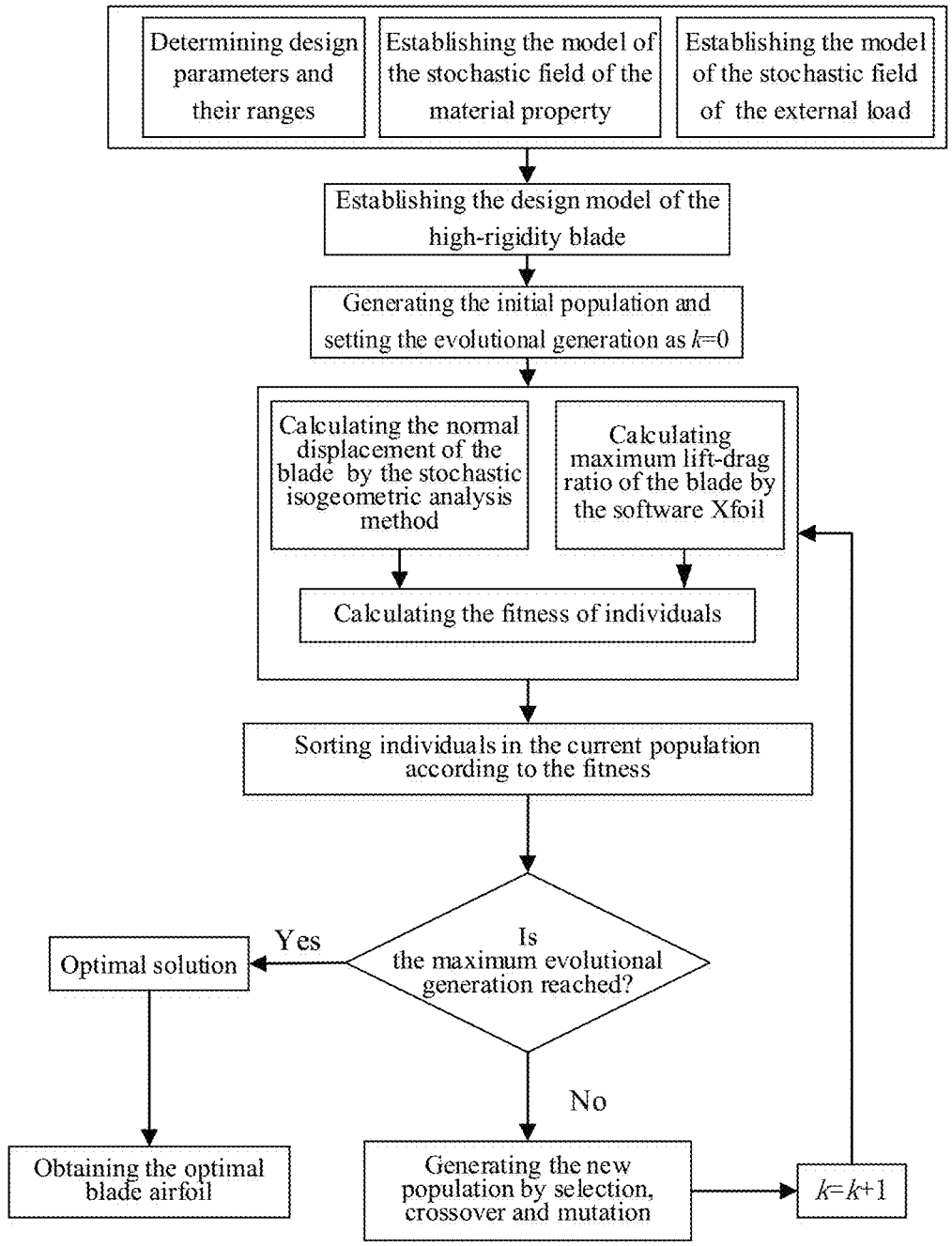
FIG. 1 is a flow chart for designing a high-rigidity blade.
Figure 2:
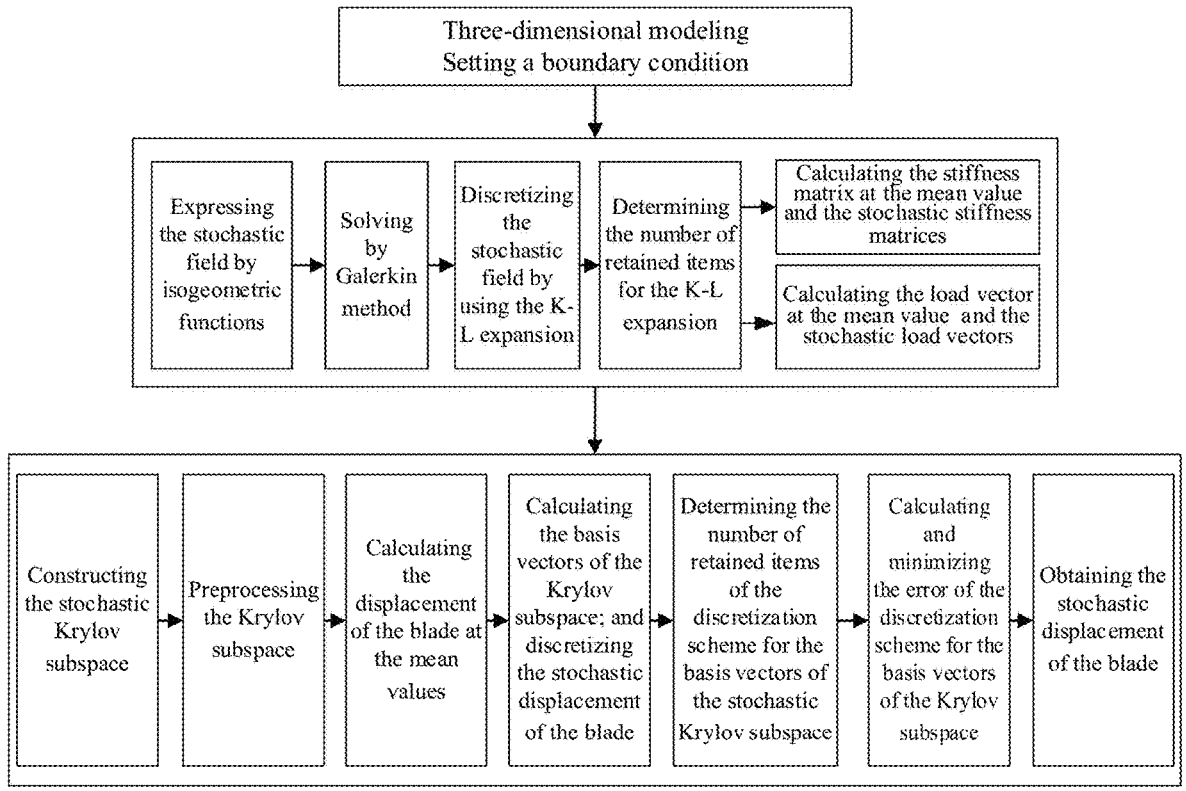
FIG. 2 is a flow chart for stochastic isogeometric analysis of a blade.

FIG. 1 is a flow chart for designing a high-rigidity blade, and FIG. 2 is a flow chart for a stochastic isogeometric analysis method of the blade. The design method for the high-rigidity blade is specifically as follows.

1) An airfoil is parameterized, and an initial blade airfoil, design variables and their variation ranges are determined according to design rules of an airfoil.

A NACA 65421 airfoil is selected as the initial airfoil, which shows an excellent hydrodynamic performance in realistic sea trials. An airfoil curve of NACA 65421 is divided into 4 curves, the start and end points of which are shown in Table 1.

TABLE 1

| Curve | Start point | End point |
|---|---|---|
| 1 | Trailing edge | Highest point of suction surface |
| 2 | Highest point of suction surface | Leading edge |
| 3 | Leading edge | Lowest point of pressure surface |
| 4 | Lowest point of pressure surface | Trailing edge |

The airfoil has a sharp trailing edge, which will increase difficulty of blade processing and affect local rigidity of the blade. Thus, a passivation treatment is performed on the trailing edge firstly. After the passivation treatment, each of the curves is fitted by a third-order Bezier curve, which requires a total of 13 control points $\{P_1, P_2, P_3, P_4, P_5, P_6, P_7, P_8, P_9, P_{10}, P_{11}, P_{12}, P_{13}\}$. Each of the control points has two coordinate parameters, i.e., X and Y. Some of the points have the same X or Y coordinate. For example, $P_3$, $P_4$ and $P_5$ have the same Y coordinate, $P_6$, $P_7$ and $P_8$ have the same X coordinate, $P_9$, $P_{10}$ and $P_{11}$ have the same Y coordinate. Therefore, there is 17 structural parameters, that is, 17 design variables, for the airfoil finally. The variation ranges of these variables are shown in Table 2, where $X_{i|ori}$ and $Y_{i|ori}$, i={1, 2, 3, 4, 5, 6, 7, 8, 9, 10, 11, 12, 13}, are the X and Y coordinates of the control point P; of the initial airfoil, respectively.

TABLE 2

| Variable | Physical meaning | Variation range |
|---|---|---|
| $Y_1$ | ordinate of the control point $P_1$ | (50%~150%) $Y_{1|ori}$ |
| $X_2$ | abscissa of the control point $P_2$ | (50%~150%) $X_{2|ori}$ |
| $Y_2$ | ordinate of the control point $P_2$ | (50%~150%) $Y_{2|ori}$ |
| $X_3$ | abscissa of the control point $P_3$ | (50%~150%) $X_{3|ori}$ |
| $Y_3$ | ordinate of the control point $P_3$ | (50%~150%) $Y_{3|ori}$ |
| $X_4$ | abscissa of the control point $P_4$ | (50%~150%) $X_{4|ori}$ |
| $X_5$ | abscissa of the control point $P_5$ | (50%~150%) $X_{5|ori}$ |
| $Y_6$ | ordinate of the control point $P_6$ | (50%~150%) $Y_{6|ori}$ |
| $Y_7$ | ordinate of the control point $P_7$ | (50%~150%) $Y_{7|ori}$ |
| $Y_8$ | ordinate of the control point $P_8$ | (50%~150%) $Y_{8|ori}$ |
| $X_9$ | abscissa of the control point $P_9$ | (50%~150%) $X_{9|ori}$ |
| $Y_9$ | ordinate of the control point $P_9$ | (50%~150%) $Y_{9|ori}$ |
| $Y_{10}$ | ordinate of the control point $P_{10}$ | (50%~150%) $Y_{10|ori}$ |
| $Y_{11}$ | ordinate of the control point $P_{11}$ | (50%~150%) $Y_{11|ori}$ |
| $X_{12}$ | abscissa of the control point $P_{12}$ | (50%~150%) $X_{12|ori}$ |
| $Y_{12}$ | ordinate of the control point $P_{12}$ | (50%~150%) $Y_{12|ori}$ |
| $Y_{13}$ | ordinate of the control point $P_{13}$ | (50%~150%) $Y_{13|ori}$ |

2) a material property and an external load of the blade considering spatially dependent uncertainties are described by stochastic fields, expressions of an objective function and a constraint function for optimizing the blade airfoil are provided according to a design requirement of the high-rigidity blade, and a high-rigidity design model of the blade is established:

$$\min f(x,r) s.t. g(x) = R_{L/D|new}(x) \geq R_{L/D|ori}; x_{min} \leq x \leq x_{max}$$

where x is a design vector, $x_{min}$ is a lower limit value of the design vector, and $x_{max}$ is an upper limit value of the design vector, as shown in Table 2; $r = \{E(\theta), F(\theta)\}$ is a stochastic field vector that characterizes randomness of Young's modulus $E(\theta)$ of a blade material and randomness of the marine current load $F(\theta)$, and $\theta$ is a set of samples in the stochastic field.

For the Young's modulus of the blade, mean value is $\mu_E = 2 \times 10^8$ Pa, standard deviation is $\sigma_E$ $2 \times 10^6$ Pa, and covariance function is exponential:

$$C_{xx}(x, x') = \sigma^2 \exp\left(-\frac{|x_1 - x_2|}{l_x} - \frac{|y_1 - y_2|}{l_y} - \frac{|z_1 - z_2|}{l_z}\right) \quad x, x' \in \mathcal{D} \subset \mathbb{R}^3$$

where $l_x = l_y = l_z = 3$ m respectively represent relevant lengths of the blade in X-axis, Y-axis and Z-axis directions.

For the marine current load exerted on the blade, mean value is $\mu_q = 1 \times 10^3$ N, standard deviation is $\sigma_q = 50$ N, and covariance function is exponential:

$$C_{xx}(x, x') = \sigma^2 \exp\left(-\frac{|x_1 - x_2|}{l_x} - \frac{|y_1 - y_2|}{l_y} - \frac{|z_1 - z_2|}{l_z}\right) \quad x, x' \in \mathcal{D} \subset \mathbb{R}^3$$

where $l_x=l_y=l_z=3$ m respectively represent the relative length of the blade in the X-axis, Y-axis and Z-axis directions.

f(x, r)=[μ(U(θ)), σ(U(θ))] is an objective function characterizing the rigidity of the blade, μ(U(θ)) is a mean of stochastic normal displacement of the blade, and σ(U(θ)) is standard deviation of the stochastic normal displacement of the blade.

$g(x)=R_{L/D|new}(x)$ is the maximum lift-drag ratio of the blade airfoil. $R_{L/D|ori}$ is the maximum lift-drag ratio of the initial airfoil, the value of which is 106.1 according to an analysis result of software Xfoil.

3) The high-rigidity design model of the blade is solved by a genetic algorithm. In the genetic algorithm, the maximum evolutional generation is set to 500, the population size is 100, the crossover probability is 0.80, and the mutation probability is 0.10.

3.1) an initial population is generated, and the evolution generation is set as k=0.

3.2) the stochastic normal displacement of the blade corresponding to each individual in a current population is calculated by the stochastic isogeometric analysis method.

Figure 3:
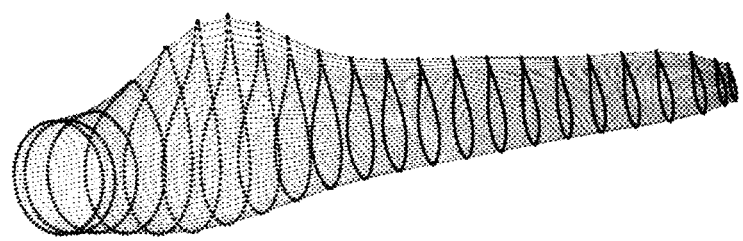
FIG. 3 is a T-spline model of a blade in a horizontal axis marine current power generator.

3.2.1) a three-dimensional parameterized model of the blade based on T-spline is established by using Rhinoceros, as shown in FIG. 3. The three-dimensional parameterized model is imported into MATLAB and boundary conditions are set.

3.2.2) the stochastic fields of the material property and the external load of the blade are discretized by following sub-steps.

3.2.2.1) representation of a covariance function of the stochastic field based on the T-spline basis functions Spectral decomposition is performed on the covariance function of the stochastic field, to represent the covariance function by its eigenvalues and corresponding eigenfunctions. Since the T-spline basis functions are a set of complete basis in Hilbert space, the eigenfunctions can be expressed by the T-spline basis functions. The expression of the covariance function of the stochastic field based on the T-spline basis functions has undetermined coefficients, which need to be solved further.

3.2.2.2) The eigenvalues and the undetermined coefficients of the covariance function is solved by Galerkin method.

The eigenvalues and eigenfunctions of the covariance functions of the stochastic fields of the blade's material property and external load can be obtained by the second kind Fredholm integral equation. However, the equation can only be solved to obtain analytical solutions in a few simple stochastic field models. In other cases, only the Galerkin method can be used to obtain numerical solutions. The application of the Galerkin method requires the truncation error to be orthogonal to the expansion space of the T-spline basis functions. This method is finally transformed into a generalized eigenvalue problem, solving the equation can obtain the eigenvalues and the undetermined coefficients in the step 3.2.2.1). Table 3 shows the calculated eigenvalues of the covariance functions of the stochastic fields of the blade's material property and external load.

TABLE 3

| No. | Eigenvalues of the covariance function of the stochastic field of the material property | Eigenvalues of the covariance function of the stochastic field of the external load |
|---|---|---|
| 1 | 4.91e+16 | 3.07e+07 |
| 2 | 4.87e+16 | 3.04e+07 |
| 3 | 4.75e+16 | 2.97e+07 |
| 4 | 4.62e+16 | 2.89e+07 |
| 5 | 4.48e+16 | 2.80e+07 |
| 6 | 4.33e+16 | 2.70e+07 |

3.2.2.3) The stochastic field is discretized by Karhunen-Loeve expansion.

The Karhunen-Loeve expansion is used to obtain discrete expressions of the stochastic fields of the material property and external load of the blade. The stochastic field is discretized into a product of stochastic variables, coefficients and T-spline basis functions, thereby simplifying handling of stochastic field into handling of stochastic variables.

3.2.2.4) The number of retained items for Karhunen-Loeve expansion is determined.

In this example, when the Karhunen-Loeve expansion is used to represent the stochastic field, 4 items are retained, so as to obtain accurate results through proper computational cost.

3.2.2.5) Stochastic stiffness matrices are calculated and a stiffness matrix at the mean value of the stochastic field of the material property is obtained, and stochastic load vectors are calculated and a load vector at the mean value of the stochastic field of the external load is obtained.

3.2.3) Stochastic structural response of the blade is discretized by following sub-steps.

3.2.3.1) Stochastic Krylov subspace of an equilibrium equation of the blade is constructed.

3.2.3.2) An inverse matrix of the stiffness matrix at the mean value of the stochastic field of the material property is used as a complexity reduction factor. A preprocessing of the stochastic Krylov subspace is realized by multiplying the complexity reduction factor respectively on left and right sides of the equilibrium equation.

The number of basis vectors of the stochastic Krylov subspace depends on the number of distinct eigenvalues of a system stiffness matrix. The inverse matrix of the stiffness matrix at the mean value of the stochastic field has fewer different eigenvalues, and thus it has less randomness. Therefore, the inverse matrix is used as the complexity reduction factor, to transform the system stiffness matrix into a matrix with a smaller number of eigenvalues, thereby greatly reducing subspace complexity. In this way, a smaller number of basis vectors can be used to obtain higher calculation accuracy.

3.2.3.3) The displacement of the blade when the stochastic fields of the material property and the external load of the blade are both at the mean values are calculated and obtained.

3.2.3.4) Basis vectors of the stochastic Krylov subspace are calculated, and the stochastic displacement of the blade is discretized by using the basis vectors, an expression of the displacement of the blade is obtained. The undetermined coefficients in the expression need to be obtained further.

3.2.3.5) The number of retained items of the discretization scheme for the basis vectors of the stochastic Krylov subspace is determined.

In this example, when the discretization scheme for the basis vectors of the stochastic Krylov subspace is used to represent the stochastic displacement of the blade, three basis vectors are taken, so that an accurate result can be obtained through proper computational cost.

3.2.3.6) An error expression of the discretization scheme for the basis vectors of the stochastic Krylov subspace is deduced.

3.2.3.7) The error is minimized by applying a Bubnov-Galerkin condition.

Applying the Bubnov-Galerkin condition can ensure the minimization of the error, thereby ensuring the accuracy of the discretization scheme for the basis vectors of the stochastic Krylov subspace. According to the Bubnov-Galerkin condition, it is required that the error should be orthogonal to the basis vectors of the preprocessed Krylov subspace, so that the undetermined coefficients in the step 3.2.3.4) can be obtained by calculation.

Figure 4:
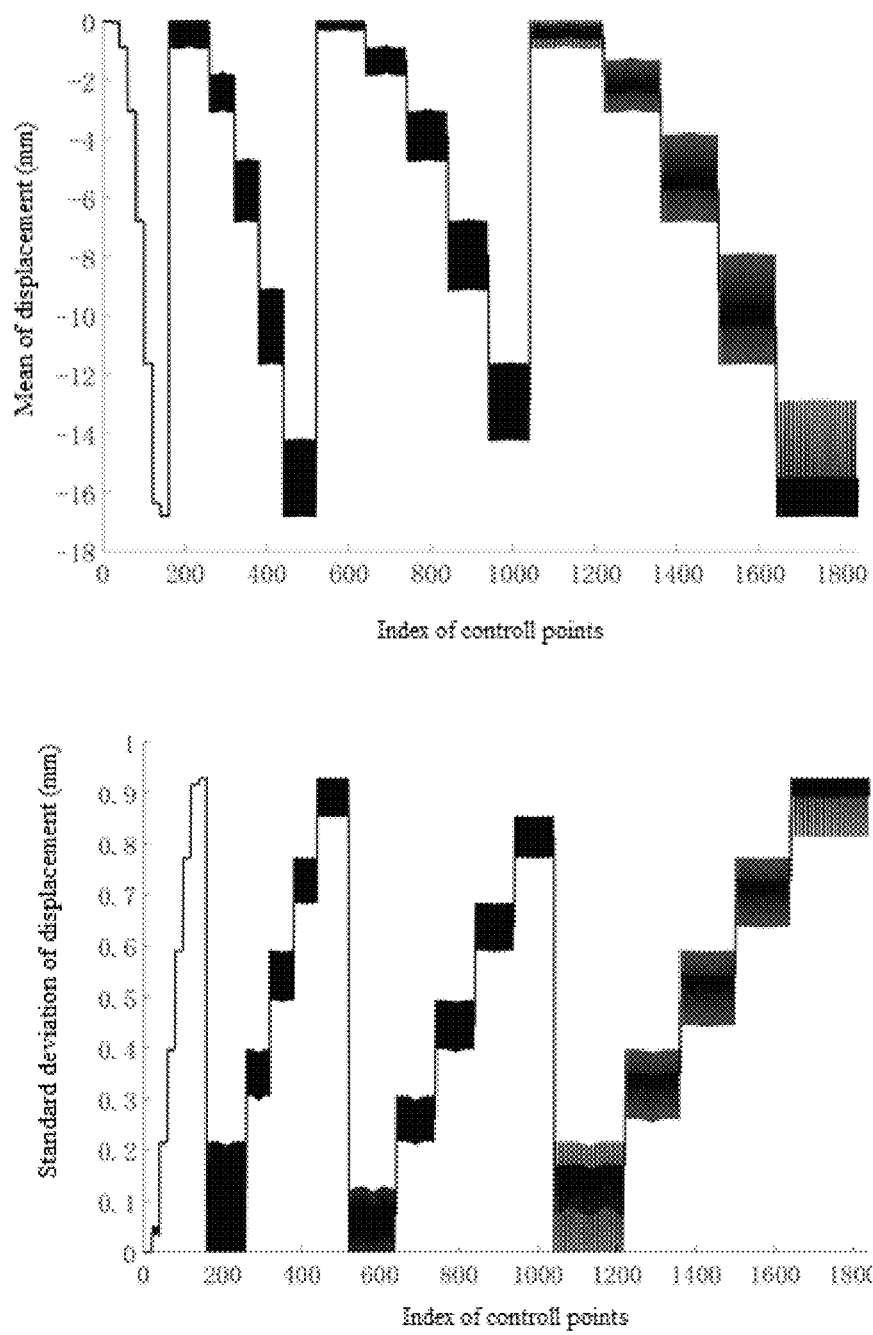
FIG. 4 shows an analysis result of a mean and standard deviation of a displacement of a blade in a horizontal axis marine current power generator.

3.2.3.8) the stochastic displacement of the blade is obtained, and the mean value and the standard deviation of the normal displacement are shown in FIG. 4.

3.3) The maximum lift-drag ratio of the blade airfoil corresponding to each individual in the current population is calculated by the software Xfoil.

3.4) Values of the objective function and constraint function in the high-rigidity design model of the blade are calculated according to the stochastic normal displacement of the blade and the maximum lift-drag ratio of the blade airfoil, to obtain fitness of all individuals in the current population 3.5) All individuals in the current population are sorted according to the fitness.

3.6) Check whether the maximum evolutional generation is reached; if yes, then an optimal solution is output; otherwise, genetic operations such as selection, crossover and mutation are performed to generate a new population, evolutional generation is updated as k=k+1, and the optimization process returns to the step 3.2).

3.7) Design parameter values of an optimal blade airfoil are obtained according to the optimal solution.

Figure 5:
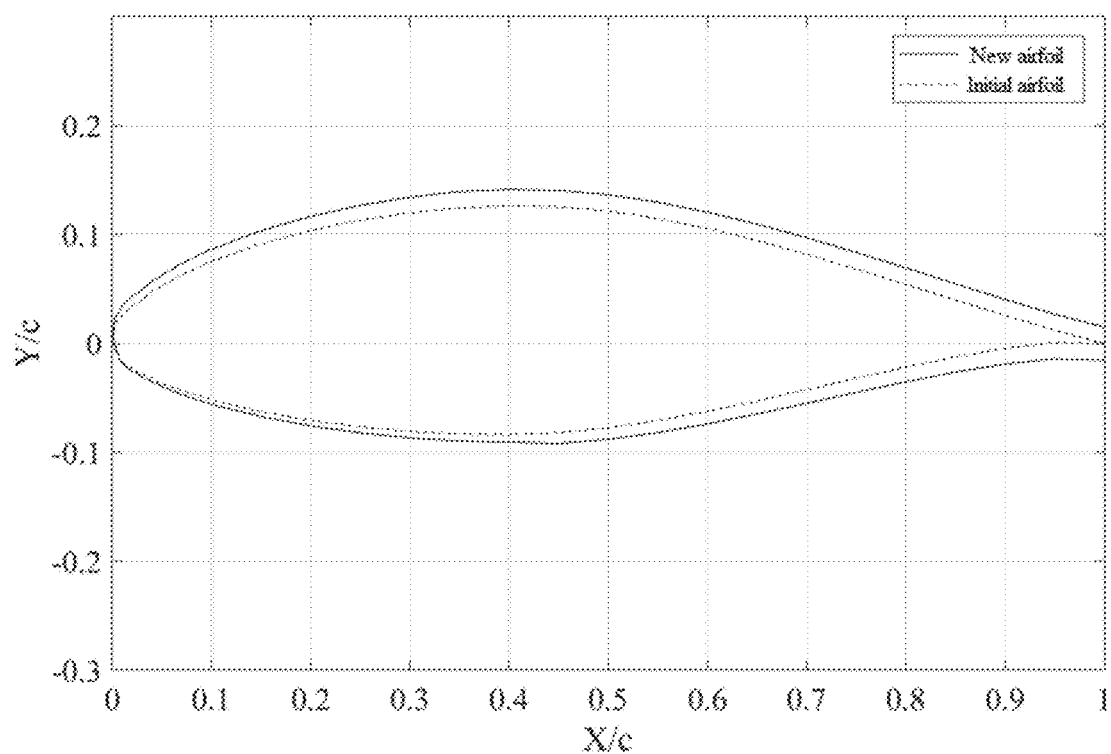
FIG. 5 is a comparison diagram of blade airfoils of a horizontal axis marine current power generator before and after optimization.

When the algorithm reaches a convergence condition, the optimal result is output. The airfoil before and after optimization is shown in FIG. 5. Comparing the result with the initial design of the airfoil, the maximum lift-drag ratio of the optimized airfoil is 113.9, which is larger than the initial value of 106.1; the maximum mean of the stochastic normal displacement of the optimized airfoil is $\mu(U(\theta)_{new})_{max}$=16.82 mm, and the maximum standard deviation of the stochastic normal displacement of the optimized airfoil is $\sigma(U(\theta)_{new})_{max}$=0.85, whereas the maximum mean of the stochastic normal displacement of the initial airfoil is $\mu(U(\theta)_{ori})_{max}$=19.31 mm, and the maximum standard deviation of the stochastic normal displacement of the initial airfoil is $\sigma(U(\theta)_{ori})_{max}$=0.93. The optimized airfoil maintains the hydrodynamic performance of the initial airfoil and improves its rigidity and robustness, which meets the high-rigidity design requirements of the blade.

What is claimed is:

1. A method for designing a high-rigidity blade of a marine current power generation based on stochastic isogeometric analysis, wherein the method comprises following steps:
   1) parameterizing a blade airfoil, and determining design parameters and ranges of the design parameters according to design rules of an airfoil;
   2) describing a material property and an external load of the blade considering spatially dependent uncertainties by using stochastic fields, providing expressions of an objective function and a constraint function for optimizing the blade airfoil according to a design requirement of the high-rigidity blade, and establishing a high-rigidity design model of the blade:

$$\min f(x,r) \, s.t. \, g(x)=R_{L/D|new}(x) \leq R_{L/D|ori}; x_{min} \leq x \leq x_{max}$$

where x is a design vector of the blade, which comprises multiple design parameters of the blade; r={E(θ), F(θ)} is a stochastic field vector, two components E(θ) and F(θ) respectively represent stochastic fields of the material property and the external load of the blade with spatially dependent uncertainties, and θ is a set of samples in the stochastic fields; f(x, r)=[μ(U(θ)), σ(U(θ))] is an objective function characterizing a rigidity of the blade, U(θ) is a stochastic normal displacement of the blade under a combined influence of a stochastic material property and a stochastic external load, μ(U(θ)) is an average value of the stochastic normal displacement of the blade, and σ(U(θ)) is a standard deviation of the stochastic normal displacement of the blade; g(x)=$R_{L/D|new}$(x) is a maximum lift-drag ratio of the blade airfoil, the maximum lift-drag ratio is independent of r, $R_{L/D|ori}$ is a maximum lift-drag ratio of an initial blade airfoil; $x_{min}$ is a lower limit value of the design vector of the blade, and $x_{max}$ is an upper limit value of the design vector;

3) calculating the stochastic normal displacement of the blade under the combined influence of the stochastic material property and the stochastic external load by using the stochastic isogeometric analysis method, wherein the stochastic normal displacement of the blade characterizes the rigidity of the blade in the high-rigidity design model of the blade; and further calculating an optimal solution to the high-rigidity design model of the blade, to obtain an optimized blade airfoil; and fabricating the blade of the marine current power generation according to the optimized blade airfoil.

2. The method for designing the high-rigidity blade based on stochastic isogeometric analysis according to claim 1, wherein in the step 3), the optimal solution of the high-rigidity design model of the blade is solved through a genetic algorithm, by following sub-steps:
   3.1) generating an initial population, and setting an evolutional generation as k=0;
   3.2) calculating the stochastic normal displacement of the blade corresponding to each individual in a current population, by using the stochastic isogeometric analysis method;
   3.3) calculating the maximum lift-drag ratio of the blade airfoil corresponding to each individual in the current population;
   3.4) calculating values of the objective function and the constraint function in the high-rigidity design model of the blade according to the stochastic normal displacement of the blade and the maximum lift-drag ratio of the blade airfoil, so as to obtain fitness of all individuals in the current population;
   3.5) sorting all individuals in the current population according to the fitness;
   3.6) checking whether a maximum evolutional generation is reached; if the maximum evolutional generation is reached, an optimal solution is derived; otherwise, performing genetic operations comprising at least one of selection, crossover and mutation to generate a new population, and setting the evolutional generation as k=k+1, returning to the step 3.2); and 3.7) obtaining design parameter values of an optimal blade airfoil according to the optimal solution.

3. The method for designing the high-rigidity blade based on stochastic isogeometric analysis according to claim 2, wherein in the step 3.2), the stochastic normal displacement of the blade considering spatially dependent stochastic uncertainties of the material and the external load of the blade is calculated by the stochastic isogeometric analysis method by following steps:
   a) establishing a parameterized three-dimensional model of the blade based on T-spline, and setting a boundary condition;
   b) discretizing the stochastic fields of the material property and the external load of the blade, by following sub-steps:
      b.1) performing an eigen decomposition on a covariance function of the stochastic field, to obtain a second kind Fredholm integral equation;
      b.2) expressing eigenfunctions of the covariance function of the stochastic field by T-spline basis functions, to obtain an expression of the covariance function of the stochastic field based on T-spline basis functions;
      b.3) solving the second kind Fredholm integral equation by a Galerkin method, to obtain a series of eigenvalues of the covariance function of the stochastic field and values of undetermined coefficients in the expression of b.2);
      b.4) obtaining discrete expressions of the stochastic fields of the material property and the external load of the blade by using a Karhunen-Loeve expansion; discretizing each stochastic field into a product of stochastic variables, coefficients and T-spline basis functions;
      b.5) determining the number of retained items for Karhunen-Loeve expansion according to a practical condition;
      b.6) calculating stochastic stiffness matrices and a stiffness matrix at a mean value of the stochastic field of the material property, and calculating stochastic load vectors and a load vector at a mean value of the stochastic field of the external load; and
   c) discretizing the stochastic normal displacement of the blade, by following sub-steps:
      c.1) constructing a stochastic Krylov subspace of an equilibrium equation of the blade;
      c.2) in order to reduce complexity of the subspace, using an inverse matrix of the stiffness matrix at the mean value of the stochastic field of the material property as a complexity reduction factor, multiplying the complexity reduction factor respectively on left and right sides of the equilibrium equation, to realize a preprocessing of the stochastic Krylov subspace;
      c.3) calculating a displacement of the blade when the stochastic fields of the material property and the external load of the blade are both at the mean values;
      c.4) calculating basis vectors of the stochastic Krylov subspace; and discretizing the stochastic normal displacement of the blade by using the basis vectors, to obtain a displacement expression of the blade;
      c.5) determining the number of retained items of a discretization scheme for the basis vectors of the stochastic Krylov subspace according to a practical condition;
      c.6) deducing an error expression of the discretization scheme for the basis vectors of the stochastic Krylov subspace;
      c.7) minimizing an error by applying a Bubnov-Galerkin condition, to ensure an accuracy of the discretization scheme for the basis vectors of the stochastic Krylov subspace, calculating undetermined coefficient vectors in the expression in c.4), according to a weak or strong form of the Bubnov-Galerkin condition; and
      c.8) obtaining the stochastic normal displacement of the blade.

4. The method for designing the high-rigidity blade based on stochastic isogeometric analysis according to claim 3, wherein a calculation equation for the stochastic normal displacement $U(\theta)$ is discretized based on the basis vectors of the stochastic Krylov subspace as follows:

$$U(\theta) = a_1\left(\bar{U} + K_0^{-1}\sum_{i=1}^{M_2}\eta_i F_i\right) + a_2\left(K_0^{-1}\sum_{i=1}^{M_1}\xi_i K_i \bar{U} + (K_0^{-1})^2\sum_{i_1=1}^{M_1}\sum_{i_2=1}^{M_2}\xi_{i_1}\eta_{i_2}K_{i_2}\bar{U}\right) +$$

$$a_3\left((K_0^{-1})^2\sum_{i_1,i_2=1}^{M_1}\xi_{i_2}\xi_{i_1}K_{i_2}K_{i_1}\bar{U} + (K_0^{-1})^3\sum_{i_1,i_2=1}^{M_1}\sum_{i_3=1}^{M_2}\xi_{i_2}\xi_{i_1}\eta_{i_3}K_{i_3}K_{i_2}\bar{U}\right) +$$

$$\ldots + a_m\left((K_0^{-1})^{m-1}\sum_{i_1,\ldots,i_{m-1}=1}^{M_1}\xi_{i_1}\ldots\xi_{i_{m-1}}K_{i_{m-1}}\ldots K_{i_2}\bar{U} + \right.$$

$$\left.(K_0^{-1})^m\sum_{i_1,\ldots,i_{m-1}=1}^{M_1}\sum_{i_m=1}^{M_2}\xi_{i_1}\ldots\xi_{i_{m-1}}\eta_{i_m}K_{i_m}\ldots K_{i_2}\bar{U}\right)$$

where $\{a_1, a_2, \ldots a_m\}$ is a coefficient vector; U is the displacement of the blade in the case that the stochastic fields of the material property and the external load of the blade are both at the mean values; E is the mean value of the stochastic field of the material property of the blade; $M_1$ is the number of retained items of the stochastic field of the material property of the blade using the Karhunen-Loeve expansion and $M_2$ is the number of retained items of the stochastic field of the external load of the blade using the Karhunen-Loeve expansion; K is a complexity reduction factor; $\{K_{i_1}, K_{i_2}, \ldots K_{i_n}\}$ is stochastic stiffness matrices; $F_i$ is a stochastic load vector; m is the number of retained items in the discretization scheme for the basis vectors of the stochastic Krylov subspace; $\{\xi_{i_1}, \xi_{i_2}, \ldots \xi_{i_n}\}$ and $\{\eta_{i_1}, \eta_{i_2}, \ldots \eta_{i_n}\}$ are respectively uncorrelated Gaussian stochastic variables.

* * * * *